United States Patent [19]

Wagner et al.

[11] Patent Number: 5,012,590
[45] Date of Patent: May 7, 1991

[54] DISPOSABLE LAYOUT TAPE

[76] Inventors: G. Anthony Wagner, 2176 E. River Rd., Grand Island, N.Y. 14072; Michael L. Horning, 30 Dellwood, Amherst, N.Y. 14226

[21] Appl. No.: 355,991
[22] Filed: May 25, 1989
[51] Int. Cl.$^5$ .............................................. G01B 3/10
[52] U.S. Cl. .................................... 33/759; 33/494
[58] Field of Search ................ 33/755, 758, 759, 494, 33/293, 294, 296, 483

[56] References Cited

U.S. PATENT DOCUMENTS

| D. 260,738 | 9/1981 | Smith | 33/494 X |
|---|---|---|---|
| 525,520 | 9/1894 | Stout | 33/293 |
| 868,905 | 10/1907 | Besse | 33/494 |
| 2,077,828 | 4/1937 | Dombrowski | 33/494 |
| 2,187,087 | 1/1940 | Leary . | |
| 2,512,285 | 6/1950 | Nippert . | |
| 2,514,455 | 7/1957 | Putnam . | |
| 2,792,110 | 5/1957 | Wanish . | |
| 2,904,891 | 9/1959 | Cook . | |
| 3,210,850 | 11/1965 | Grzyb | 33/758 |
| 3,621,579 | 11/1971 | Dubitsky . | |
| 3,648,835 | 3/1972 | Yucel . | |
| 4,149,320 | 4/1979 | Troyer et al. | 33/755 |
| 4,845,858 | 7/1989 | Thomas | 33/759 |

FOREIGN PATENT DOCUMENTS

| 154107 | 8/1938 | Fed. Rep. of Germany | 33/755 |
|---|---|---|---|
| 2936393 | 3/1981 | Fed. Rep. of Germany | 33/771 |
| 12395 | 6/1984 | United Kingdom | 33/494 |
| 10220 | 10/1986 | United Kingdom | 33/494 |

Primary Examiner—Harry N. Hardian
Attorney, Agent, or Firm—Edwin T. Bean, Jr.; Martin G. Linihan; John C. Thompson

[57] ABSTRACT

A layout tape is disclosed for use in positioning building materials, such as studding, joists and rafters, in a building, wherein the tape is intended to be left in place within the building upon completion. The layout tape preferably has an adhesive backing facilitating positioning/mounting thereof at a point of use and an indicia/design bearing surface serving to indicate to a user the direction of layout, centers in desired multiples of unit lengths and right/left material mounting positions in relation to such centers.

13 Claims, 1 Drawing Sheet

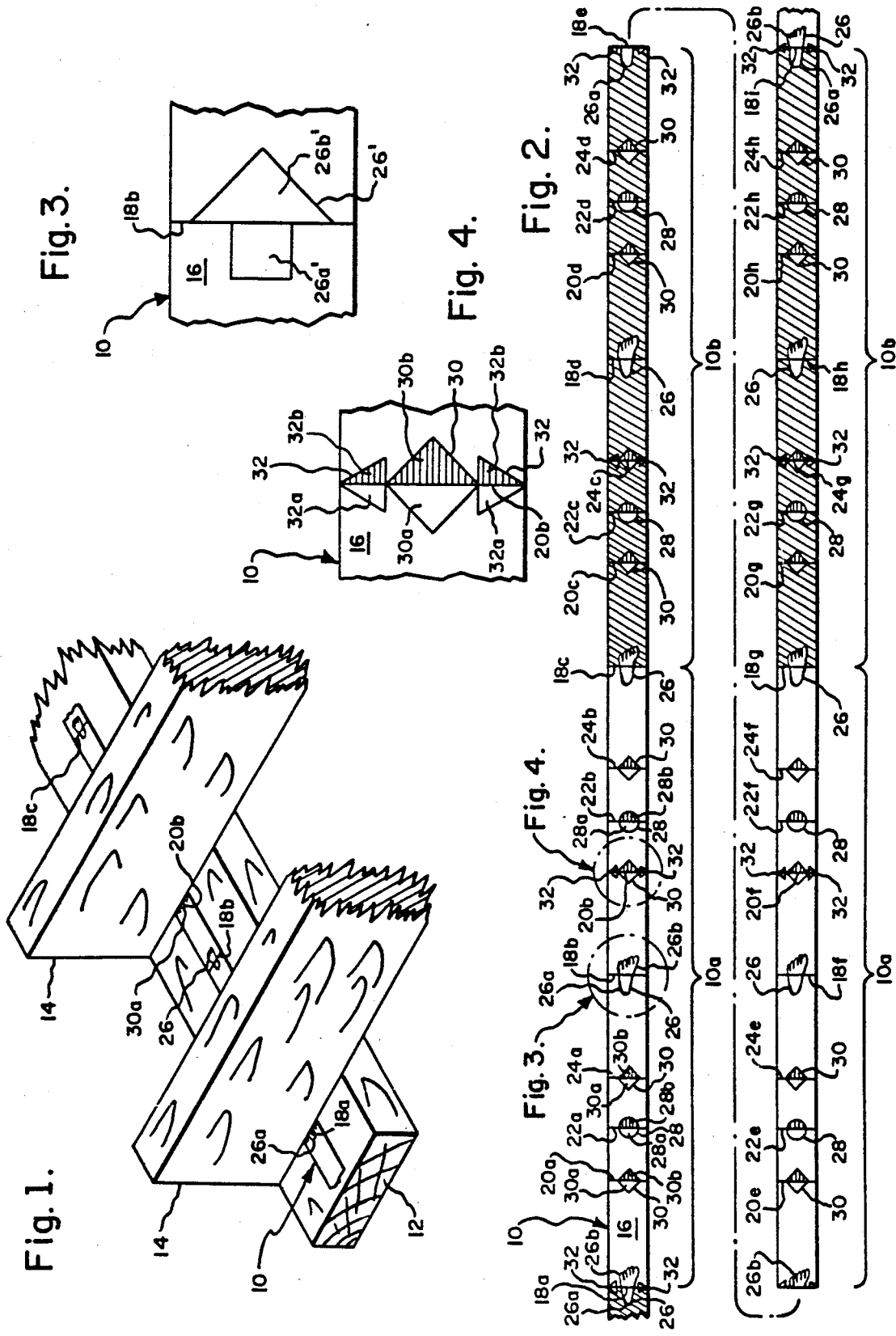

DISPOSABLE LAYOUT TAPE

BACKGROUND OF THE INVENTION

The present invention generally relates to layout tapes particularly adapted for use as an aid in building construction.

Heretofore, it has been proposed, as evidenced by U.S. Pat. No. 2,187,087, to provide an adhesively backed, disposable layout tape as an aid to positioning studding of a building. This tape has limited utility in that it bears indicia adapted to indicate only one spacing unit, such as that indicating sixteen inch centers.

It has also been proposed to provide a map measuring tape with different colors, as evidenced by U.S. Pat. No. 2,514,455; and to provide geometric figures on an adhesive tape to indicate the length of tape removed from a dispenser, as evidenced by U.S. Pat. No. 3,648,835. These prior tapes are not adapted for use in the construction of buildings.

SUMMARY OF THE INVENTION

The present invention is directed towards a disposable layout tape for use as an aid to positioning building materials, such as for example studs, joists and rafters, of a building under construction.

More particularly, the layout tape of the present invention is provided with indicia, such as reference lines, serving to divide the tape lengthwise into one foot segments and such one foot segments into at least four and eight inch segments, and designs associated with the reference lines and having dissimilar portions thereof disposed on opposite sides of the reference lines for visually indicating to a user the direction of use or layout of the tape and for forming a convenient guide or reference ensuring proper placement of building materials intended to be laid out "on center", "away" or "back". Preferably, the tape is also divided lengthwise thereof into a series of pairs of contrasting, alternately arranged two foot segments, which serve to provide for ready recognition of two, four, six and eight foot sections of the tape, and provided with further designs associated with certain of the reference lines for visually indicating sixteen inch segments of the tape.

The layout tape of the present invention may be provided with an adhesive backing for facilitating retention thereof on a surface against which building materials are to be laid out.

BRIEF DESCRIPTION OF THE DRAWINGS

The nature and mode of operation of the present invention will now be more fully described in the following detailed description taken with the accompanying drawings wherein:

FIG. 1 is a perspective view illustrating the layout tape of the present invention in use for positionally locating joists relative to a sill plate;

FIG. 2 is a fragmentary plane view of the layout tape;

FIG. 3 is an enlarged view of the area designated as FIG. 3 in FIG. 2, but showing alternative directional indicia; and FIG. 4 is an enlarged view of the area designated as FIG. 4 in FIG. 2.

DETAILED DESCRIPTION

Reference is first made to FIG. wherein an elongated layout tape formed in accordance with the present invention is generally designated as 10 and shown as being applied to a sill plate 12 for purposes of aiding in the proper positioning of joists 14 and 14 lengthwise of the sill plate.

Layout tape 10 may be fabricated from any low cost pliable strip material, which is characterized as being relatively dimensionally stable in a lengthwise direction; as having a rear or mounting surface, not shown, capable of receiving a backing or coating of an adhesive material suitable for mounting or attaching the layout tape in a flatwise manner to diverse materials including for instance wood, metal and concrete; and as having a front or indicia surface 16 capable of being imprinted with guide and reference indicia to be described. Layout tape 10 may be formed by cutting elongated strips from suitable paper, plastic and fabric sheet materials, which as desired may be reinforced with lengthwise extending filaments of fiberglass or the like tending to minimize stretching of the layout tape in a lengthwise direction.

It is contemplated that the layout tape would be fabricated in multiple convenient lengths, such as 50 feet, 100 feet, 150 feet, 200 feet, or greater lengths, wherein the tape is rolled upon itself with a suitable peel-off strip being applied as a protective covering to the adhesive backing, if required by the nature of the finish of front surface 16 to prevent adherence of the adhesive thereto and/or protect the indicia appearing thereon. Alternatively, layout tape 10 need not be provided with an adhesive backing where a lower cost product is desired and users find it satisfactory to fix the layout tape in a desired position by other available means, such as nails or staples.

Reference is now made particularly to FIG. 2, wherein front surface 16 of approximately an eight foot length of layout tape 10 is shown as being provided with one foot segments, such as may be defined by appropriate indicia, such as transversely extending reference lines 18a–18i, wherein each one foot segment is divided into four, six and eight inch segments by appropriate indicia, such as transversely extending reference lines 20a–20h, 22a–22h and 24a–24h, respectively. Each reference line is rendered visually identifiably by a unique value/direction indicating design, such as the outline of a person's foot 26 for the case of one foot segments, a circle 28 for the case of each six inch segment, and a diamond 30 for the case of each four inch and eight inch segment. It is not necessary to distinguish the four inch segments from the eight inch segments by means of different value/direction indicating designs, since their values are readily visually determined by their placement intermediate six inch length circle designs 28 and foot designs 26, but of course it is possible to do so.

In the presently preferred construction, value/direction indicating designs 26, 28 and 30 are configured and/or shaded and arranged to bridge across or straddle their associated reference lines in order to indicate direction of intended use of a given length of tape for layout purposes, as well as selected placement of articles relative to their associated reference lines. Thus, differently shaped heel and toe portions 26a and 26b of design 26 and the light and shaded or differently colored portions 28a and 28b, and 30a and 30b of designs 28 and 30 cooperate to indicate the overall direction of intended use of tape 10 for layout purposes, which as shown in FIG. 2 would be from left to right. On the other hand, the arrangement of portions 26a and 26b, 28a and 28b, and 30a and 30b on opposite sides of their respective reference lines provides a workman with a clear visual guide facilitating placement of building materials selectively "on center", "away" or "back" relative to such reference lines with a view towards ensuring that building materials are uniformly spaced when secured in place. Preferably, all of portions 28a and 30a would be of a first color and all of portions 28b and 30b would be of a second color, which contrasts with the first color, and for this purpose white and black are considered to be colors.

Again referring to FIG. 2, it will be noted that tape 10 is also shown as being divided into a series of pairs of contrasting, alternatively arranged two foot segments or intervals, as indicated at 10a and 10b, so as to facilitate visual identification of multiple even foot lengths, such as two, four, six and eight foot lengths, which are commonly used for building layout purposes. Contrast between adjacent two foot segments may be provided by employing different colors or shadings. Further, sixteen inch lengths commonly used in positioning of studs, joists and rafters are preferably indicated by providing further or additional designs, such as triangle designs 32, in association with appropriate ones of the reference lines. Thus, for the tape segment depicted in FIG. 2, triangle designs 32 would be placed successively in association with reference lines 18a, 20b, 24c, 18e, 20f, 24g and 18i. If desired, triangle designs 32 may have light and shaded or differently colored portions 32a and 32b, as best shown in FIG. 4, which match the appearance of portions 28a, 30a and 28b, 30b, respectively. Preferably, the first of the further or triangle designs 32 would be associated with reference line 18a of the first full series of pairs of two foot segments printed on tape 10.

FIG. 3 illustrates an alternative design in the form of an arrow 26' particularly adapted for use in place of foot design 26. Arrow design 26' serves to clearly indicate overall tape direction due to the provision of arrow shaft portion 26a' and head portion 26b'. As will be apparent, other designs are also susceptible of use in place of circular design 28 and diamond design 30.

In use, a suitable length of tape 10 is applied to a surface, such as a sill plate 12, along which building materials such as joists 14 are desired to be applied with a uniform spacing being maintained therebetween. Initial positioning of tape 10 relative to sill plate 12 will be determined by the desired position of the first joist and whether placement of the joists is to be "on center", "away" or "back" relative to an initial point of reference or layout starting position. In the arrangement illustrated in FIG. 1, reference line 18a is aligned with a desired initial point of reference, and joists 14 are intended to be positioned at sixteen inch intervals "away" from the initial point of reference, that is, the first joist is positioned immediately to the right of reference line 18a and the second joist is positioned immediately to the right of reference line 20b. Exposed portions 26a and 30a provide quick visual verification that the joists are properly positioned prior to commencement of nailing of the joists in place. If it was desired to arrange joists 14 "back" relative to the initial point of reference, such joists would be positioned immediately to the left of reference lines 18a and 20b in which case exposed portions 26b and 30b would serve to confirm proper positioning of the joists. Further, if joists 14 were to be placed "on center" relative to reference lines 18a and 20b, the lack of exposure of any of portions 26a, 26b, 30a and 30b would serve to visually indicate that proper positioning had been achieved. Obviously, proper sixteen inch spacing may be achieved by initially placing any other reference line denoted by triangle design 32 at the initial point of reference.

One, two and four foot layout spacings may be readily achieved by the use of foot designs 26 and the observance of contrasting segments 10a and 10b. Six inch layout spacings may be achieved by use of foot designs 26 and circle designs 28, and four inch layout spacings may be achieved by observing the foot designs 26 and diamond designs 30.

The present invention is not limited to use of the specific type of value/direction indicating designs shown in the drawings, and, if desired, designs in the form of numerals 1, 4, 6 and 8 may be substituted therefor. However, the use of geometric figures having differently colored or shaded portions is preferred for designating the four, six and eight inch segments, in that the correct positioning of building members in an "away" or "back" sense is more readily observable by a user, whereas a natural direction indicating foot or arrow design is preferably employed to divide the tape into its primary one foot segments. While it is possible to do so, it is nonetheless preferable to avoid application to the tape 1, 2, 3, 5, 7, 9, 10 and 11 inch markings, since reference lines and designs associated therewith might lead to reading errors in use of the tape, and it is contemplated that it may be found in practice to be desirable to even eliminate the described six inch reference lines and designs, since same are not necessary to adapt the tape for use with the common sixteen inch center to center layouts. Also, since the present tape is intended to be made available in long lengths from which lengths are cut to suit each particular layout requirement, it is not advantageous to imprint the tape with graduated numerical markings, such as 1 through 250, for the case where a tape would be marketed in an initial 250 foot length.

What is claimed is:

1. A layout tape for positioning building structural members such as studs, joists and rafters comprising an elongated strip divided lengthwise into a series of pairs of visually contrasting, alternatively arranged two foot segments, each of said two foot segments having indicia designating one foot segments therein and four, six and eight inch segments within each of said one foot segments, and having designs associated with said indicia for visually indicating to a user the direction of use of said tape, said designs also co-operating with said indicia to form a reference ensuring proper placement of said structural members for selective location on center, away or back relative to the indicia with which said design are associated, and further designs are associated with certain of said designs for visually indicating sixteen inch segments commencing with the beginning of one of said two foot segments of said series and ending with the end of a next adjacent one of said two foot segments of said series.

2. A layout tape according to claim 1, wherein said indicia are reference lines extending transversely of said tape and said designs have portions thereof disposed on opposite sides of said reference lines, said portions of said design differing from one another for visually indication to a user the direction of use of said tape.

3. A layout tape for positioning building structural members such as studs, joists and rafters comprising an elongated strip provided with transversely extending reference lines dividing said tape lengthwise into one foot segments and each of said one foot segments into at least four and eight inch segments, said strip being divided lengthwise into a series of visually contrasting, alternately arranged segments of equal length, and designs associated with said reference lines and having portions thereof disposed on opposite sides of said reference lines, said portions of each of said designs differing from one another for visually indicating to a user the direction of use of said tape, said designs also co-operating with said reference lines to form a reference ensuring proper placement of said structural members for selective location on center, away or back relative to the reference lines with which said designs are associated.

4. A layout tape according to claim 3, wherein said portions of said designs disposed on first sides of said reference lines have a first color and said portions of said designs disposed on opposite sides of said reference lines have a second color, and said first color differs from said second color.

5. A layout tape according to claim 3, wherein said designs associated with said reference lines dividing said tape into said one foot segments are similar and differ from said designs associated with said reference lines dividing said one foot segments into said four and eight inch segments, and the last said designs are similar.

6. A layout tape according to claim 3, wherein said tape is further divided lengthwise into a series of pairs of contrasting, alternately arranged two foot segments, and said reference lines divide said two foot segments into one foot segments.

7. A layout tape according to claim 3, wherein said tape is provided with further designs for visually indicating sixteen inch segments of said tape, and a first of said further designs is associated with that one of said reference lines designating the commencement of a first of said one foot segments on said tape.

8. A layout tape according to claim 3, wherein said tape is further divided lengthwise into a series of pairs of contrasting, alternately arranged two foot segments, said reference lines divide said two foot segments into one foot segments, said tape is provided with further designs for visually indicating sixteen inch segments of said tape, and a first of said further designs is associated with that one of said reference lines designating the commencement of a first of said series of pairs of contrasting, alternately arranged two foot segments.

9. A layout tape according to claim 8, wherein said designs associated with said reference lines dividing said tape into said one foot segments are similar to one another and differ from said designs associated with said reference lines dividing said one foot segments into said four and eight inch segments, and said further designs are similar to one another and differ from said designs.

10. A layout tape according to claim 9, wherein certain of said reference lines further divide said one foot segments into six inch segments and have designs associated therewith which are similar to one another, but differ from said further designs and said designs associated with said reference lines dividing said tape into said one foot segments and dividing said one foot segments into said four and eight inch segments, and said designs associated with said reference lines dividing said one foot segments into said four and eight inch segments are similar.

11. A layout tape according to claim 10, wherein said portions of said designs disposed on first sides of said reference lines have a first color and said portions of said designs disposed on opposite sides of said reference lines have a second color, and said first color differs from said second color.

12. A layout tape according to claim 1, wherein each of said designs has a dimension extending longitudinally of said tape, said dimension having equal portions extending in opposite longitudinal directions in relation to the co-operating indicia, said dimension being equal to the thickness of the building structural members being positioned so that when a structural member is placed on center relative to the indicia none of the associated design is visible thereby indicating proper positioning.

13. A layout tape according to claim 3, wherein each of said designs has a dimension extending longitudinally of said tape, said dimension having equal portions extending in opposite longitudinal directions in relation to the associated reference line, said dimension being equal to the thickness of the building structural members being positioned so that when a structural member is placed on center relative to the reference line none of the associated design in visible thereby indicating proper positioning.

* * * * *